United States Patent
Rodenberg et al.

(10) Patent No.: US 8,657,343 B2
(45) Date of Patent: Feb. 25, 2014

(54) QUICK CONNECTOR ASSEMBLY

(75) Inventors: Andrew Rodenberg, Wilmington, NC (US); Paul J. Lake, Waltham, MA (US)

(73) Assignee: Watts Water Technologies, Inc., North Andover, MA (US)

( * ) Notice: Subject to any disclaimer, the term of this patent is extended or adjusted under 35 U.S.C. 154(b) by 144 days.

(21) Appl. No.: 13/366,920

(22) Filed: Feb. 6, 2012

(65) Prior Publication Data

US 2013/0200607 A1 Aug. 8, 2013

(51) Int. Cl.
*F16L 35/00* (2006.01)

(52) U.S. Cl.
USPC .............. 285/82; 285/319; 285/321; 285/322

(58) Field of Classification Search
USPC ........... 285/82, 243–244, 319, 321–322, 339, 285/342, 360, 401
See application file for complete search history.

(56) References Cited

U.S. PATENT DOCUMENTS

| | | | |
|---|---|---|---|
| 3,334,661 A * | 8/1967 | Milette | 138/89 |
| 4,753,458 A | 6/1988 | Case et al. | |
| 4,915,421 A | 4/1990 | Dennany Jr. | |
| 5,096,235 A * | 3/1992 | Oetiker | 285/308 |
| 5,131,693 A * | 7/1992 | Miller | 285/364 |
| 5,553,901 A * | 9/1996 | Serot | 285/340 |
| 6,170,882 B1 * | 1/2001 | Prest | 285/12 |
| 6,637,780 B2 | 10/2003 | Miyajima et al. | |
| 6,854,772 B2 | 2/2005 | Weller et al. | |
| 6,964,434 B2 | 11/2005 | Beck et al. | |
| 7,021,669 B1 | 4/2006 | Lindermeir et al. | |
| 7,100,948 B2 * | 9/2006 | Guest | 285/376 |
| 7,410,193 B2 * | 8/2008 | Guest | 285/376 |
| 2005/0285395 A1 * | 12/2005 | Feith | 285/322 |
| 2006/0108802 A1 * | 5/2006 | Baumgartner | 285/322 |
| 2008/0143106 A1 * | 6/2008 | O'Neill et al. | 285/321 |

* cited by examiner

*Primary Examiner* — Aaron Dunwoody
*Assistant Examiner* — Fannie Kee
(74) *Attorney, Agent, or Firm* — Edwards Wildman Palmer LLP; George N. Chaclas; David J. Silvia

(57) ABSTRACT

A connector assembly including a connector body having a coupling end and sealing means. A collet couples to the connector body and has resilient fingers. An adjustment ring has a stop and defines guide tracks. A collar has protrusions coupled in the guide tracks. A ferrule is slidingly housed within the collar and adjustment ring. A locking split ring clips onto the adjustment ring to limit travel of the collar. In a locked position, the locking split ring is installed and a pipe, inserted into the connector body is retained in place by the resilient radially inward fingers of the collet and sealed by the sealing means. In the released position, the collar has been moved to force the ferrule into the collet to splay the resilient fingers such that the pipe is freely insertable and removeable from the connector assembly.

11 Claims, 5 Drawing Sheets

QUICK CONNECTOR ASSEMBLY

TECHNICAL FIELD OF THE DISCLOSURE

The present disclosure relates to a quick connector assemblies for connecting a pipe into a fluid system. Without particular preparation, the pipe may be repeatedly joined and disconnected to the fluid system by using the disclosed quick connector technology.

BACKGROUND OF THE DISCLOSURE

There are many residential and industrial applications for fluid networks such as home irrigation, indoor plumbing, heating, cleaning systems and the like. All of these common systems utilize piping, fittings and connectors to create the fluid networks. Many of the prior art fitting and connectors are difficult to assemble because special tools, caulking and sealants are required. Moreover, even with the proper tools and accessories, many of the connectors still require complex assembly and are not suited to repeated reuse.

SUMMARY OF THE DISCLOSURE

What is still desired is a new and improved connector assembly for fluid networks. The connector assembly is preferably simple to assemble and easy to utilize without difficult and/or time consuming assembly. In addition, the connector assembly will reliably accomplish the desired piping connection without leaking and be adaptable to a variety of applications.

The present disclosure provides a connector assembly for a pipe including an elongated cylindrical threaded connector body defining an inner axial flowpath. The connector body has a fluid port end and a coupling end, the coupling end defining a pipe shoulder, an o-ring shoulder, and a member shoulder. An o-ring seats against the o-ring shoulder and a guide member is set against the seat member shoulder. The guide member has an annular base surrounded by a circumferential sidewall with a beveled edge. A collet is contained against the elongated cylindrical threaded connector, the collet having resilient radially inward fingers extending within the circumferential sidewall of the seat member. An adjustment ring couples to the coupling end. The adjustment ring has a stop on an inner wall and defines at least one guide track with a locked position and a released position on an outer wall. A collar has at least one protrusion for coupling in the at least one guide track to retain the collar to the adjustment ring such that the collar moves axially towards the connector body and rotates with respect to the adjustment ring when the at least one protrusion moves from the locked position to the released position and vice versa. A ferrule is housed within the collar and adjustment ring, the ferrule having a beveled end and a flanged end. A spring surrounds the ferrule and extends between the flanged end of the ferrule and the stop of the adjustment ring to bias the ferrule and collar away from the adjustment ring. A locking split ring clips onto the adjustment ring to limit travel of the collar and, in turn, the ferrule towards the adjustment ring. In the locked position, the locking split ring is installed and a pipe, inserted into the connector body against the pipe shoulder of the coupling end, is retained in place by the resilient radially inward fingers of the collet and sealed to the inner axial flowpath by the o-ring. In the released position, the collar has forced the beveled edge of the ferrule into the collet to splay the resilient radially inward fingers such that a pipe is freely insertable and removeable from against the pipe shoulder.

Preferably, the connector includes threads for coupling to a fluid system. In one embodiment, the at least one protrusion for coupling in the at least one guide track is four protrusions and four guide tracks.

The subject disclosure is also directed to a connector assembly for a pipe including a connector body having a coupling end and sealing means. A collet couples to the connector body, the collet having resilient radially inward fingers. An adjustment ring couples to the coupling end. The adjustment ring has a stop on an inner wall and defines at least one guide track with a locked position and a released position on an outer wall. A collar has at least one protrusion for coupling in the at least one guide track to retain the collar to the adjustment ring such that the collar moves axially towards the connector body and rotationally with respect to the adjustment ring when the at least one protrusion moves from the locked position to the released position and vice versa. A ferrule housed within the collar and adjustment ring has a beveled end. A locking split ring clips onto the adjustment ring to limit travel of the collar and, in turn, the ferrule travel towards the adjustment ring. In the locked position, the locking ring is installed. A pipe is inserted into the connector body and retained in place by the resilient radially inward fingers of the collet. The sealing means seals the pipe. In the released position, the locking split ring has been removed and the collar has forced the beveled edge of the ferrule into the collet to splay the resilient radially inward fingers such that the pipe is freely insertable and removeable from the connector assembly.

Preferably, the connector assembly further includes a seat member coupled to the connector body having an annular base surrounded by a circumferential sidewall as well as a spring surrounding the ferrule for biasing the ferrule and collar away from the adjustment ring.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout.

DETAILED DESCRIPTION OF EXEMPLARY EMBODIMENTS

Figure 1:
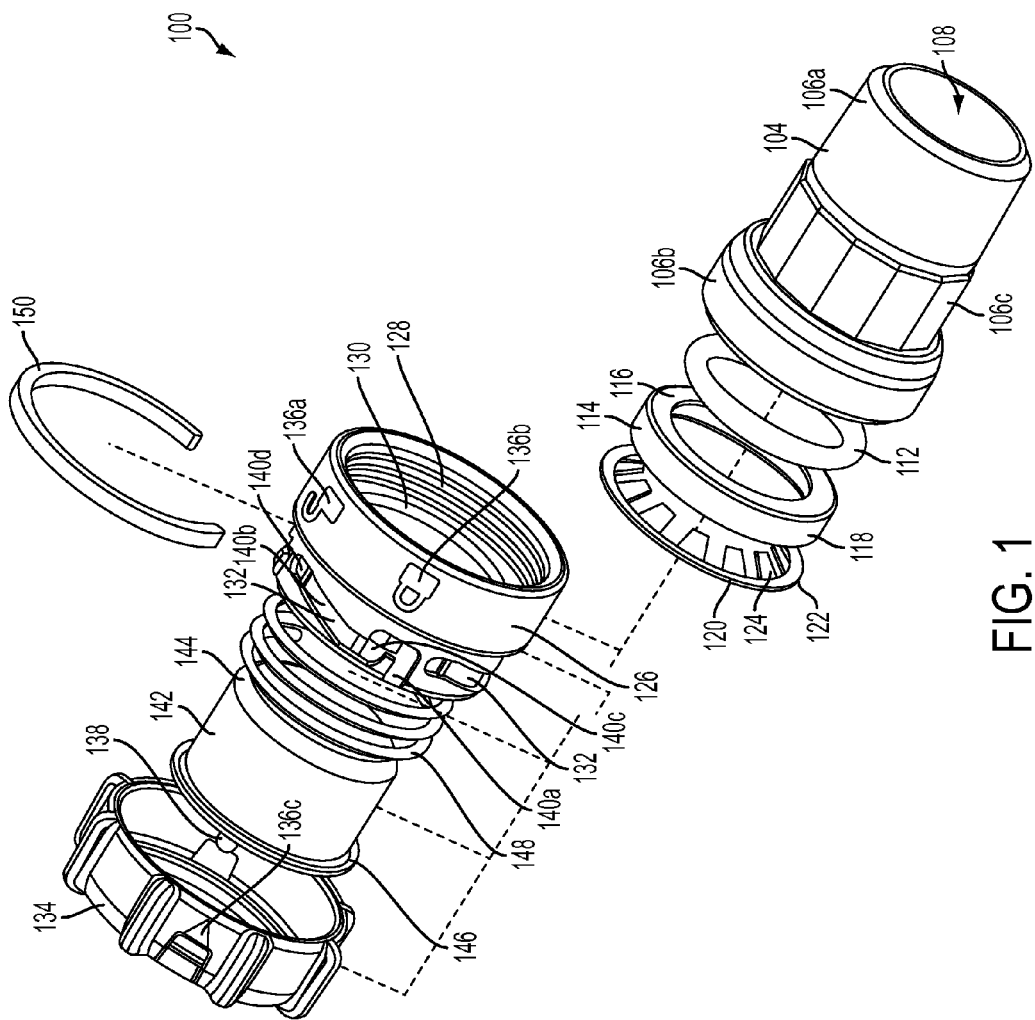
FIG. 1 is an exploded perspective view of a connector assembly in accordance with the subject technology.

The present disclosure overcomes many of the prior art problems associated with quick connector assemblies. In general, connector assemblies are used to interconnect pipes to create extensive fluid systems and networks. Among other features and benefits, the disclosed quick connector assembly facilitates quick and easy installation. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

All relative descriptions herein such as upward, downward, left, right, up, down, length, height, width, thickness and the like are with reference to the Figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed quick connector assemblies. Additionally, the shapes and sizes of components are also exemplary and can be altered without materially affecting or limiting the disclosed technology.

Referring first to FIG. 1, an exploded perspective view of a connector assembly 100 in accordance with the subject technology is shown. The connector assembly 100 sealingly engages a pipe 102 (shown in FIGS. 2A-3B). The pipe 102 need not have any particular preparation to be sealingly engaged but rather simply cleanly cut. In one embodiment, the pipe 102 is rigid and 1.25 inches in diameter such as cross-linked polyethylene but many suitable sizes and materials are known to those of ordinary skill.

The connector assembly 100 includes an elongated cylindrical connector body 104. The outer radius of each end 106a, 106b is threaded (although not depicted as such for simplification) whereas an intermediate portion 106c has flat portions configured to interface with a wrench or like tightening tool (not shown). The fluid port end 106a connects to a system or fluid network (not shown) in a traditional manner and defines an inner axial flowpath 108. The coupling end 106b also defines another portion of the inner axial flowpath 108.

Figure 2A:
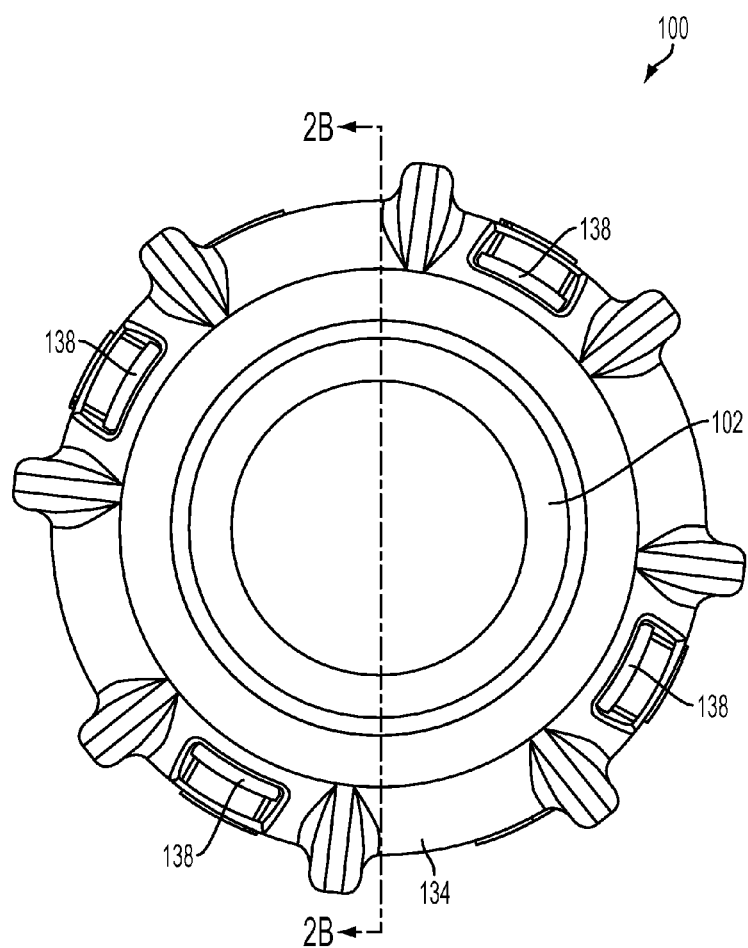
FIG. 2A is an end view of the connector assembly of FIG. 1 in the locked position.
Figure 2B:
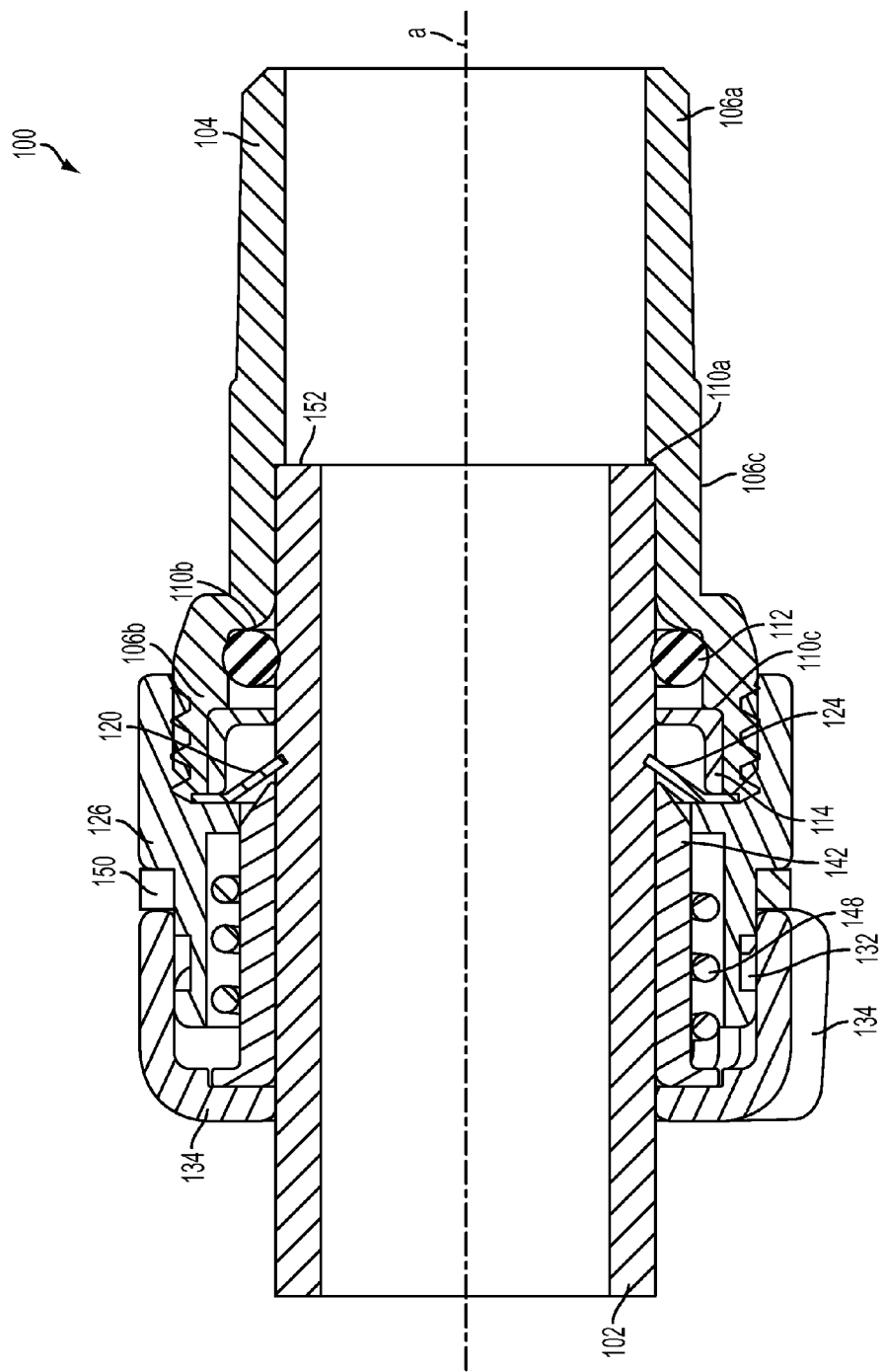
FIG. 2B is a sectional view of the connector assembly of FIG. 1 taken along line 2B-2B in FIG. 2A.

Referring additionally to FIGS. 2A and 2B, end and sectional views of the connector assembly 100 in the locked position are shown, respectively. As best seen in FIG. 2B, the connector body 104 also defines a pipe shoulder 110a, an o-ring shoulder 110b, and a seat member shoulder 110c along the inner axial flowpath 108. The pipe 102 seats against the pipe shoulder 110a when fully inserted in the connector assembly 100 as described below. An o-ring 112 seats against the o-ring shoulder 110b and seals against the inserted pipe 102.

A guide member 114 has an annular base 116 surrounded by a circumferential sidewall 118. The annular base 116 rests against the seat member shoulder 110c and helps guide and/or support the pipe 102. A collet 120 rests against the connector body 104 and/or the sidewall 118. The collet 120 is an annular ring 122 with a plurality of resilient radially inward fingers 124 bent towards the fluid port end 106a at an angle with respect to an axis "a" of the connector assembly 100. The sidewall 118 of the guide member 114 may have a complimentary beveled edge so that the fingers 124 are substantially contained within the circumferential sidewall 118.

As best seen in FIG. 1, an adjustment ring 126 couples to the coupling end 106b of the connector body 104. The adjustment ring 126 has a threaded end 128 for engaging the threaded coupling end 106b of the connector body 104. The adjustment ring 126 also has an inner stop 130 which presses against the annular ring 122 to hold the collet 120 in place against the connector body 104 and/or guide member sidewall 118 when assembled. In a preferred embodiment, the inner stop 130 is a flat annular ring.

The adjustment ring 126 also defines a series of guide tracks 132 that interact with a collar 134 to define a locked position and a released position. Indicia 136a-c on the adjustment ring 126 and collar 134 provide a visual indication of the locked and released positions. The collar 134 has a protrusion 138 that rests within each guide track 132. Thus, the shape of the guide tracks 132 determines the axial and rotational movement of the collar 134 with respect to the adjustment ring 126.

Each guide track 132 has an axial portion 140a that allows coupling the respective protrusion 138 into the guide track 132. The guide track 132 has an operative area that includes a slanted portion 140b extending between a locked position portion 140c and released position portion 140d. As a result, the collar 134 moves axially towards the connector body 104 and radially with respect to the adjustment ring 126 when the protrusions 138 move from the locked position portion 140c of the guide track 132 to the released position portion 140d and vice versa.

A ferrule 142 is housed within the collar 134 and adjustment ring 126. The ferrule 142 has a beveled end 144 and a flanged end 146. A spring 148 surrounds the ferrule 142 to bias the ferrule 142 and, thereby, the collar 134 away from the adjustment ring 126. The spring 148 extends between the flanged end 146 of the ferrule 142 and the stop 130 of the adjustment ring 126 to generate the biasing force. A removable locking split ring 150 clips onto the adjustment ring 126 to further limit travel of the collar 134 and, in turn, the ferrule 142 towards the adjustment ring 126.

The Locked Position

Referring now particularly to FIGS. 2A and 2B, end and sectional views of the connector assembly 100 in the locked position are shown, respectively. In the locked position, the protusions 138 are resting in the locked position portion 140c of the guide tracks 132. The locking split ring 150 is installed on the adjustment ring 126 so that the collar 134 cannot be moved from the locked to released position. In other words, the locking split ring 150 prevents the protrusions 138 from sliding along the slanted transitional portion 140b into the released position portion 140d.

The pipe 102 has been inserted into the connector body 104 against the pipe shoulder 110a of the coupling end 106b. The resilient radially inward fingers 124 of the collet 120 engage the pipe 102 and prevent withdrawal. The collet 120 is firmly held in place between the stop 130 of the adjustment ring 126 and the connector body 104. The guide member sidewall 118 may support the collet 120 additionally or instead of the connector body 104 directly. The o-ring 112 provides a fluid seal against the pipe 102 so that the inner axial flowpath 108 is leak-proof.

The Released Position

Figure 3A:
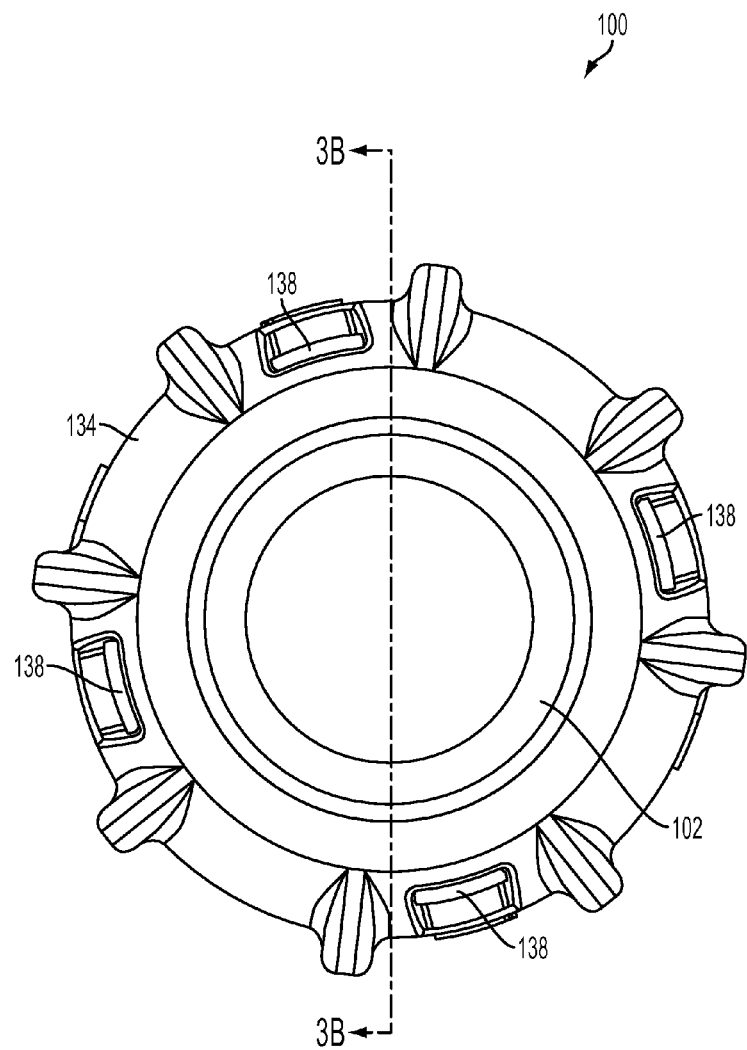
FIG. 3A is an end view of the connector assembly of FIG. 1 in the released position.
Figure 3B:
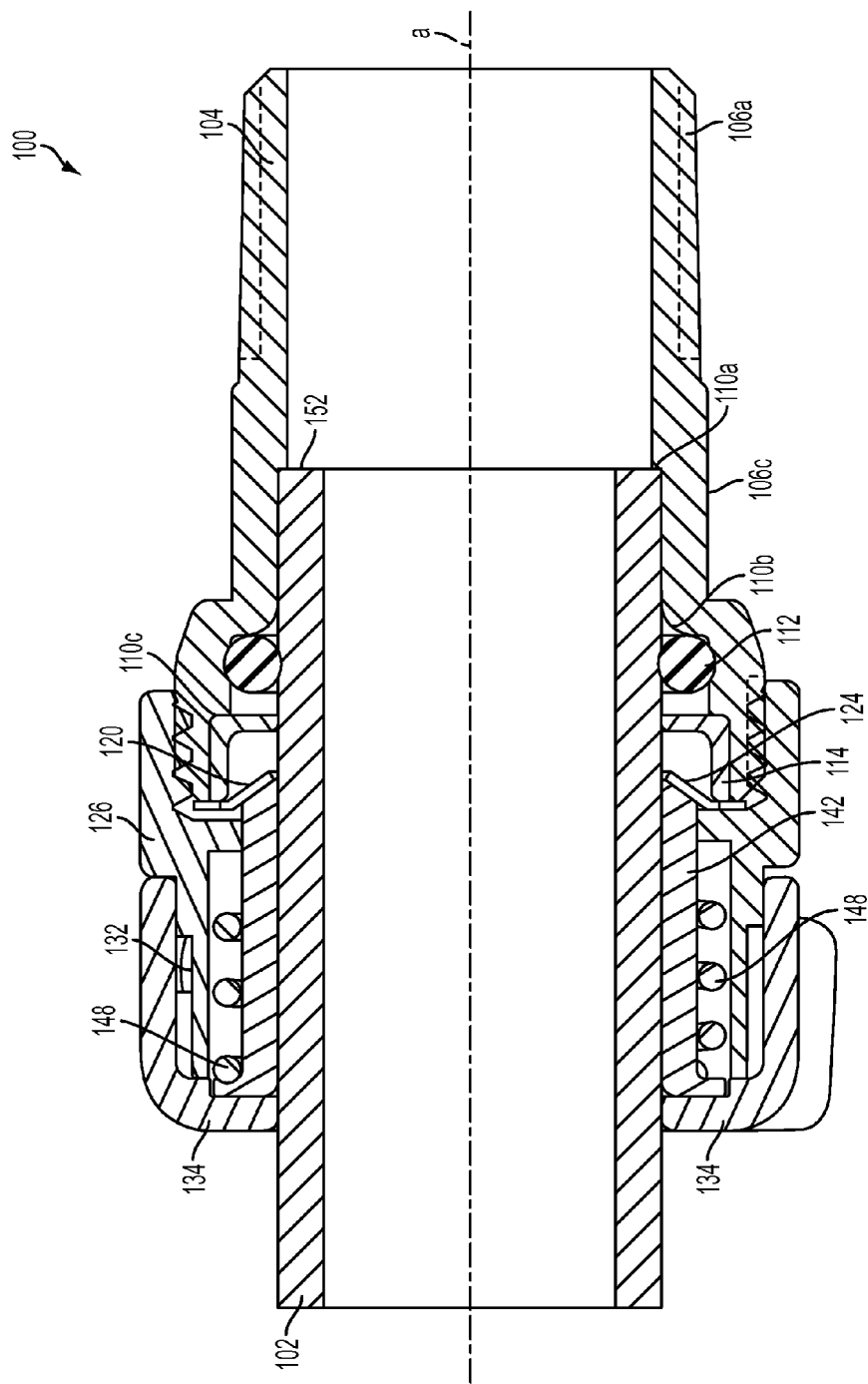
FIG. 3B is a sectional view of the connector assembly of FIG. 1 taken along line 3B-3B in FIG. 3A.

Referring now to FIGS. 3A and 3B, end and sectional views of the connector assembly 100 in the released position are shown, respectively. In the released position, the pipe 102 may be removed from or inserted into the connector assembly 100 by hand. To set the connector assembly 100 into the released position from the locked position, the locking ring 150 is removed. The collar 134 is pressed toward the adjustment ring 126 to overcome the biasing of the spring 148 and move the protrusions 138 out of the locked position portion 140c of the guide tracks 132.

Then, the collar 134 can be rotated so that the arrow indicia 136c thereon can be moved from pointing to the locked indicia 136b to the unlocked indicia 136a. By doing so, the protrusions 138 move in the slanted transitional portion 140b of the guide tracks 132 into the locked position portion 140d. Thus, the collar 134 moves closer to the adjustment ring 126 forcing the ferrule 142 into the stationary collet 120. The beveled edge 144 of the ferrule 142 splays open the resilient radially inward fingers 124 of the collet 120 to remove the capturing pressure on the pipe 102. In this released position, the pipe 102 is freely insertable and removeable from against the connector assembly 100.

Locking A Pipe

The guide tracks 132 are shaped such that the protrusions will rest in either of the locked or release position portions 140c, 140d as desired by the user. The locking ring 150 is removed. To capture or lock the pipe 102, the collar 134 is pushed and rotated into the released position, e.g., the protrusions 138 travel out of the locked position portion 140c, through the slanted portion 140b and into the released position portion 140d of the guide tracks 132. The pipe 102 is inserted through the collar 134, the splayed collet 120, the guide member 114, and the o-ring 112 so that the end 152 of the pipe 102 is against the pipe shoulder 110a.

Then, the collar 134 is slightly depressed to exit the released position portion 140d, and rotated so that the protrusions 138 pass through the slanted transitional portion 140b back into the locked position portion 140c. The spring 148 is then free to bias the ferrule 142 away from the collet 120 allowing the fingers 124 of the collet 124 to act on and lock the pipe 102 to the connector assembly. The locking ring 150 is clipped onto the adjustment ring 126 to prevent accidental movement of the collar 134 into the released position.

In other embodiments, the collet has more or less fingers and is fabricated from stainless steel. Preferably, there are four guide tracks and protrusions but as few as one or any number may be utilized. The fluid port end of the connector body can be adapted to work in a plurality of applications and is not limited to the embodiment shown. For example, the connector assembly could be integrally joined with a similar connector assembly to form a pipe to pipe joint of which the pipes need not even be the same diameter.

As can be seen, the subject technology provides connector assemblies that are simple to construct and easy to operate by hand. The connector assemblies can also be adapted to various size piping and coupled to any manner of subsequent component in a variety of systems.

The present disclosure provides a new and improved connector assemblies. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects.

What is claimed is:

1. A connector assembly for a pipe comprising:
   an elongated cylindrical threaded connector body defining an inner axial flowpath, the connector body having a fluid port end and a coupling end, the coupling end defining a pipe shoulder, an o-ring shoulder, and a seat member shoulder;
   an o-ring seated against the o-ring shoulder;
   a guide member set against the seat member shoulder, the guide member having an annular base surrounded by a circumferential sidewall with a beveled edge;
   a collet contained against the elongated cylindrical threaded connector, the collet having resilient radially inward fingers extending within the circumferential sidewall of the guide member;
   an adjustment ring coupled to the coupling end, the adjustment ring having a stop on an inner wall and defining at least one guide track with a locked position and a released position on an outer wall;
   a collar having at least one protrusion for coupling in the at least one guide track to retain the collar to the adjustment ring such that the collar moves axially towards the connector body and rotates with respect to the adjustment ring when the at least one protrusion moves from the locked position to the released position and vice versa;
   a ferrule housed within the collar and adjustment ring, the ferrule having a beveled end and a flanged end;
   a spring surrounding the ferrule and extending between the flanged end of the ferrule and the stop of the adjustment ring to bias the ferrule and collar away from the adjustment ring; and
   a locking ring for clipping onto the adjustment ring to limit travel of the collar and, in turn, the ferrule travel towards the adjustment ring,
   wherein,
   in the locked position, the locking ring is installed and a pipe, inserted into the connector body against the pipe shoulder of the coupling end, is retained in place by the resilient radially inward fingers of the collet and sealed to the inner axial flowpath by the o-ring, and,
   in the released position, the collar has forced the beveled edge of the ferrule into the collet to splay the resilient radially inward fingers such that a pipe is freely insertable and removable from against the pipe shoulder.

2. A connector assembly as recited in claim 1, wherein the connector includes threads for coupling to a fluid system.

3. A connector assembly as recited in claim 1, wherein the at least one protrusion for coupling in the at least one guide track is four protrusions and four guide tracks.

4. A connector assembly for a pipe comprising:
   a connector body having a coupling end and sealing means;
   a collet coupled to the connector body, the collet having resilient radially inward fingers;
   an adjustment ring coupled to the coupling end, the adjustment ring having a stop on an inner wall and defining at least one guide track with a locked position and a released position on an outer wall;
   a collar having at least one protrusion for coupling in the at least one guide track to retain the collar to the adjustment ring such that the collar moves axially towards the connector body and rotationally with respect to the adjustment ring when the at least one protrusion moves from the locked position to the released position and vice versa;
   a ferrule housed within the collar and adjustment ring, the ferrule having a beveled end; and
   a locking ring for clipping onto the adjustment ring to limit travel of the collar and, in turn, the ferrule travel towards the adjustment ring,
   wherein,
   in the locked position, the locking ring is installed and a pipe, inserted into the connector body is retained in place by the resilient radially inward fingers of the collet and sealed by the sealing means, and, in the released position, the collar has forced the beveled edge of the ferrule into the collet to splay the resilient radially inward fingers such that the pipe is freely insertable and removable from the connector assembly.

5. A connector assembly as recited in claim 4, further comprising a seat member coupled to the connector body having an annular base surrounded by a circumferential sidewall.

6. A connector assembly as recited in claim 4, further comprising a spring surrounding the ferrule for biasing the ferrule and collar away from the adjustment ring.

7. A connector assembly as recited in claim 4, wherein the sealing means is an o-ring.

8. A connector assembly for a pipe comprising:
   a connector body having a first end adapted to connect to a fluid network and a second end;
   a collet coupled to the second end of the connector body, the collet having resilient radially inward fingers;
   an adjustment ring coupled to the second end, the adjustment ring defining at least one guide track with a locked position and a released position;
   a collar having at least one protrusion for coupling in the at least one guide track to retain the collar to the adjustment ring; and
   a ferrule housed within the collar and adjustment ring,
   wherein,
   in the locked position, a pipe is retained in the connector body by the resilient radially inward fingers of the collet, and, in the released position, the collar has forced the ferrule into the collet to splay the resilient radially inward fingers such that the pipe is freely insertable and removable from the connector assembly.

9. A connector assembly as recited in claim 8, wherein the collar moves axially towards the connector body and rotationally with respect to the adjustment ring when the at least one protrusion moves from the locked position to the released position and vice versa.

10. A connector assembly as recited in claim 8, wherein the ferrule has a beveled end that splays the resilient radially inward fingers.

11. A connector assembly as recited in claim 8, further comprising a locking split ring for clipping onto the adjustment ring to limit travel of the collar and, in turn, the ferrule towards the adjustment ring in the locked position.

* * * * *